United States Patent
Goldin et al.

(10) Patent No.: US 10,346,471 B2
(45) Date of Patent: Jul. 9, 2019

(54) DRIVER JUKEBOX SYSTEM

(71) Applicant: Lyft, Inc., San Francisco, CA (US)

(72) Inventors: Evan Goldin, San Francisco, CA (US); James Addison, San Francisco, CA (US); Brady Law, San Francisco, CA (US); Christopher John Selin, San Francisco, CA (US); Marc Haumann, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 61 days.

(21) Appl. No.: 15/174,802

(22) Filed: Jun. 6, 2016

(65) Prior Publication Data

US 2016/0328471 A1  Nov. 10, 2016

Related U.S. Application Data

(63) Continuation of application No. 14/657,061, filed on Mar. 13, 2015, now Pat. No. 9,384,271.

(Continued)

(51) Int. Cl.

| | |
|---|---|
| *G06F 17/00* | (2019.01) |
| *G06F 16/638* | (2019.01) |
| *G06F 16/60* | (2019.01) |
| *G06F 16/635* | (2019.01) |
| *H04W 4/02* | (2018.01) |
| *G06F 3/16* | (2006.01) |

(Continued)

(52) U.S. Cl.
CPC ............ *G06F 16/639* (2019.01); *G06F 3/165* (2013.01); *G06F 16/60* (2019.01); *G06F 16/635* (2019.01); *H04W 4/027* (2013.01); *H04W 4/04* (2013.01); *H04W 8/20* (2013.01)

(58) Field of Classification Search
CPC ................ G06Q 30/0645; G06Q 50/14; G06F 17/30772; G06F 17/30769; G06F 17/30778; G06F 17/30761; G06F 3/165
See application file for complete search history.

(56) References Cited

U.S. PATENT DOCUMENTS

| | | | |
|---|---|---|---|
| 9,384,271 B1 | 7/2016 | Goldin et al. | |
| 2013/0246301 A1* | 9/2013 | Radhakrishnan .. | G06Q 30/0282 705/347 |

(Continued)

OTHER PUBLICATIONS

Mike Isaac. Uber Said to Announce Music Partnership With Spotify. The New York Times. Nov. 14, 2014. http://bits.blogs.nytimes.com/2014/11/14/uber-said-to-announce-music-partnership-with-spotify/?smid=tw-nytimesbits&_r=1.

(Continued)

*Primary Examiner* — Md S Elahee
*Assistant Examiner* — David Siegel
(74) *Attorney, Agent, or Firm* — Keller Jolley Preece

(57) ABSTRACT

A system for a driver jukebox on a driver device includes a music server system interface, a ride server system, a playlist determiner, a ride started determiner, and a music player. The music server system interface is for providing a driver credential to a music server system. The ride server system interface is for receiving a rider music preference from a rider device. The playlist determiner is for determining a playlist based at least in part on the rider music preference. The ride started determiner is for determining that a ride for the rider has started. The music server system interface for indicating to play the playlist.

20 Claims, 14 Drawing Sheets

Related U.S. Application Data

(60) Provisional application No. 61/970,810, filed on Mar. 26, 2014.

(51) Int. Cl.
   *H04W 4/04* (2009.01)
   *H04W 8/20* (2009.01)

(56) References Cited

U.S. PATENT DOCUMENTS

2014/0188920 A1   7/2014  Sharma et al.
2015/0228000 A1*  8/2015  Bijor .................. G06Q 30/0613
                                                                   705/13

OTHER PUBLICATIONS

Doug MacMillan. Uber holding press call Monday with "special partner guest." Treble clef on the invite suggests it's music related? Twitter, Inc. https://twitter.com/dmac1/status/533373465542524928. Nov. 14, 2014.

Non-Final Office Action issued in corresponding U.S. Appl. No. 14/657,061 dated May 19, 2015.

Final Office Action issued in corresponding U.S. Appl. No. 14/657,061 dated Sep. 14, 2015.

Notice of Allowance issued in corresponding U.S. Appl. No. 14/657,061 dated Jan. 4, 2016.

Notice of Allowance issued in corresponding U.S. Appl. No. 14/657,061 dated Mar. 14, 2016.

* cited by examiner

DRIVER JUKEBOX SYSTEM

This application is a continuation of co-pending U.S. patent application Ser. No. 14/657,061, entitled DRIVER JUKEBOX SYSTEM filed Mar. 13, 2015 which is incorporated herein by reference for all purposes, which claims priority to U.S. Provisional Patent Application No. 61/970,810 entitled DRIVER JUKEBOX filed Mar. 26, 2014 which is incorporated herein by reference for all purposes.

BACKGROUND OF THE INVENTION

For a vehicle driven by a driver, the music played in the vehicle is limited to being controlled by the driver. For example, a music service available for a driver using a driver device enables the driver to queue selected music for playing during a ride. The driver is able to customize the music environment of the vehicle to make the ride pleasant and enjoyable. Typically, anyone else in the vehicle experiences the same music environment regardless of their own music preferences.

BRIEF DESCRIPTION OF THE DRAWINGS

Various embodiments of the invention are disclosed in the following detailed description and the accompanying drawings.

DETAILED DESCRIPTION

Figure 1:
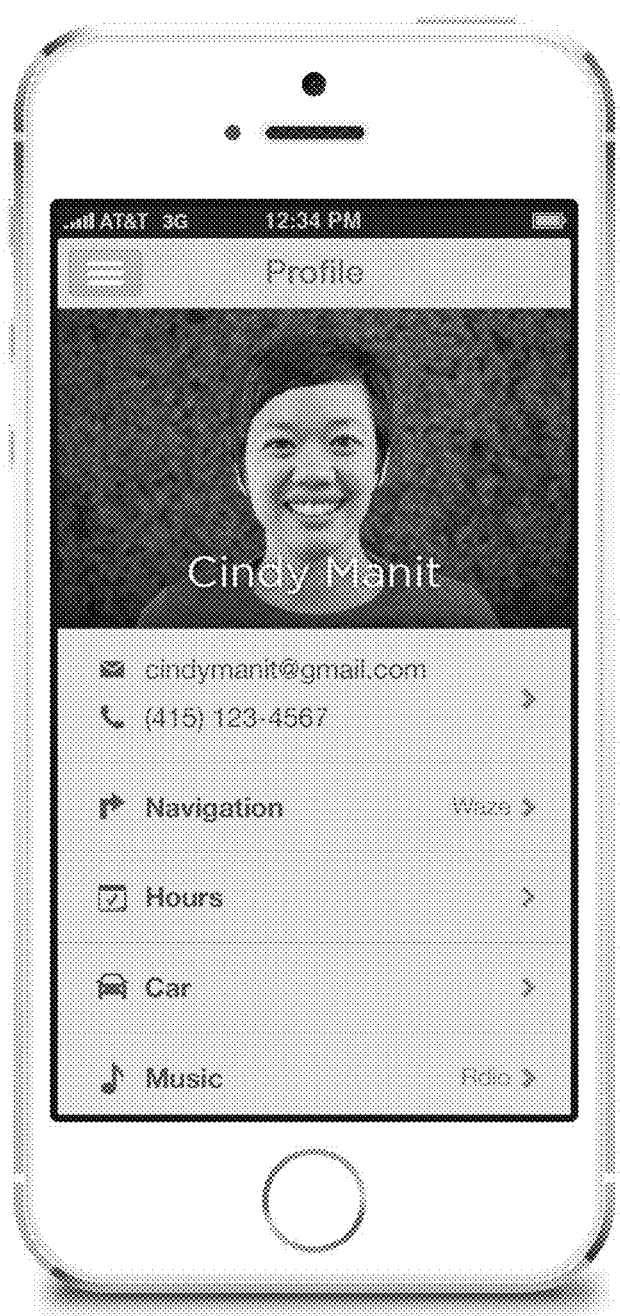
FIG. 1 is a diagram illustrating an embodiment of a user interface for a driver system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a driver jukebox is disclosed. A driver jukebox on a driver device comprises a music server system interface for providing a driver credential to a music server system, a ride server system interface for receiving a rider music preference from a rider device, a playlist determiner for determining a playlist based at least in part on the rider music preference, a ride started determiner for determining that a ride for the rider has started, and a music server system interface for indicating to play the playlist.

In some embodiments, a system for playing music (e.g., a driver device) is improved by enabling another user (e.g., a rider) to tailor a music environment. The system enables a rider to select music available from a music service that is associated with a driver and a driver's device prior to and during a ride using the rider's device. The system enables the queuing of multiple pieces of music (e.g., using a playlist) to be played using the music service that is associated with the driver during a ride in a vehicle to create an enjoyable music environment for the rider based on the music preferences of the rider. In some embodiments, the driver's device pre-buffers music of the rider's playlist automatically prior to the ride and starts the playing of the playlist when the rider begins. In some embodiments, the driver's device automatically plays the playlist when the driver's device and the rider's device are co-located (e.g., in the event that a geolocation system determines that the driver device and the rider device are in close proximity—for example, within a threshold distance of each other). In some embodiments, the system is enabled by a ride sharing system that has capability of allowing a rider to select music for a driver's device and an associated driver's music service, where the driver's music service requires a driver's credential to authorize use of the music service.

In some embodiments, a driver jukebox comprises a set of music files (e.g., songs) to play during a ride. In some embodiments, the driver jukebox corresponds to song preferences of a driver and/or to song preferences of a rider or passenger (e.g., while sharing a ride). In some embodiments, a set of preferences (e.g., driver song preferences, passenger or rider song preferences) is received through a social music service (e.g., Rdio, Spotify™, etc.). In some embodiments, songs for a driver jukebox are played via a social music service.

In some embodiments, common songs, albums, and/or artists are selected for a playlist of a ride (e.g., as determined by the driver and/or passenger being logged into a music service that enables determination of common song preferences, common album preferences, common artist preferences, common genre preferences, etc.). In some embodiments, a passenger is not required to log into a music service so that matching common preferences cannot be determined through the music service. In some embodiments, only the driver has to log into a music service (e.g., Rdio or Spotify™) in order to play music for the passenger.

In some embodiments, a passenger is able to queue music to play once they have been paired with a driver, before the driver arrives, and then once the driver starts the ride, the music automatically starts playing.

In some embodiments, in the event that the passenger does not specify song preferences, the driver selects a default jukebox playlist. In some embodiments, the driver has access to a user interface for controlling jukebox playback (e.g., a user interface including a play button, a pause button, a skip button, etc.). In some embodiments, a receipt (e.g., a receipt indicating an amount donated for the ride share) received by a passenger comprises a link to a driver playlist (e.g., so that the rider can access the driver playlist at a later point, e.g., via a social music service). In some embodiments, a driver periodically (e.g., once a day, once a week, once a month, etc.) receives a notification comprising a link to a playlist of songs played recently (e.g., since the last notification) by their passengers.

FIG. 1 is a diagram illustrating an embodiment of a user interface for a driver system. In some embodiments, the user interface of FIG. 1 is used by a driver as part of a ride sharing system. In some embodiments, the user interface of FIG. 1 comprises a user interface for a ride sharing app. In the example shown, the user interface of FIG. 1 comprises a driver settings screen for a ride sharing app. Driver settings comprise driver info settings (e.g., driver email address, driver phone number), driver navigation settings (e.g., a selection of a navigation app), driver hours settings (e.g., the hours that the driver is available to driver), driver car settings (e.g., driver car make, driver car model, driver car year, driver car photo, etc.), and driver music settings (e.g., whether the driver has jukebox enabled, selection of a music service, music service credentials, etc.).

Figure 2:
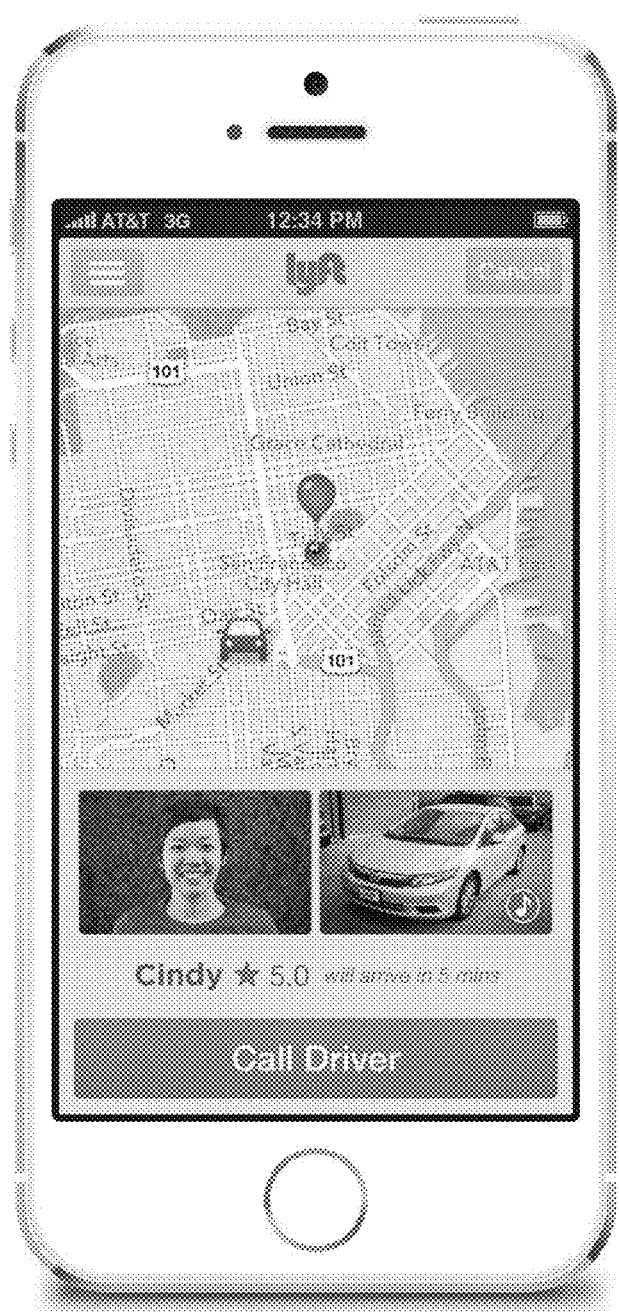
FIG. 2 is a diagram illustrating an embodiment of a user interface for a rider system.

FIG. 2 is a diagram illustrating an embodiment of a user interface for a rider system. In some embodiments, the user interface of FIG. 2 is used by a rider as part of a ride sharing system. In some embodiments, the user interface of FIG. 2 comprises a user interface for a ride sharing app. In the example shown, the user interface of FIG. 2 comprises a ride assignment screen for a ride sharing app. The ride assignment screen indicates to a rider that a driver has been assigned to give them a ride. The ride assignment screen displays a driver location, a driver photo, a driver name, a driver rating, an estimated driver arrival time, a vehicle photo, and an indication of a driver jukebox status. In some embodiments, in the event that the driver has enabled a driver jukebox, a driver jukebox enabled indication is shown. In some embodiments, in the event that the driver has not enabled a driver jukebox, a driver jukebox enabled indication is not shown. In some embodiments, in the event that the rider makes an indication (e.g., a tap, a click, a selection) to a driver jukebox enabled indication, a jukebox music selection interface is displayed to the rider.

Figure 3:
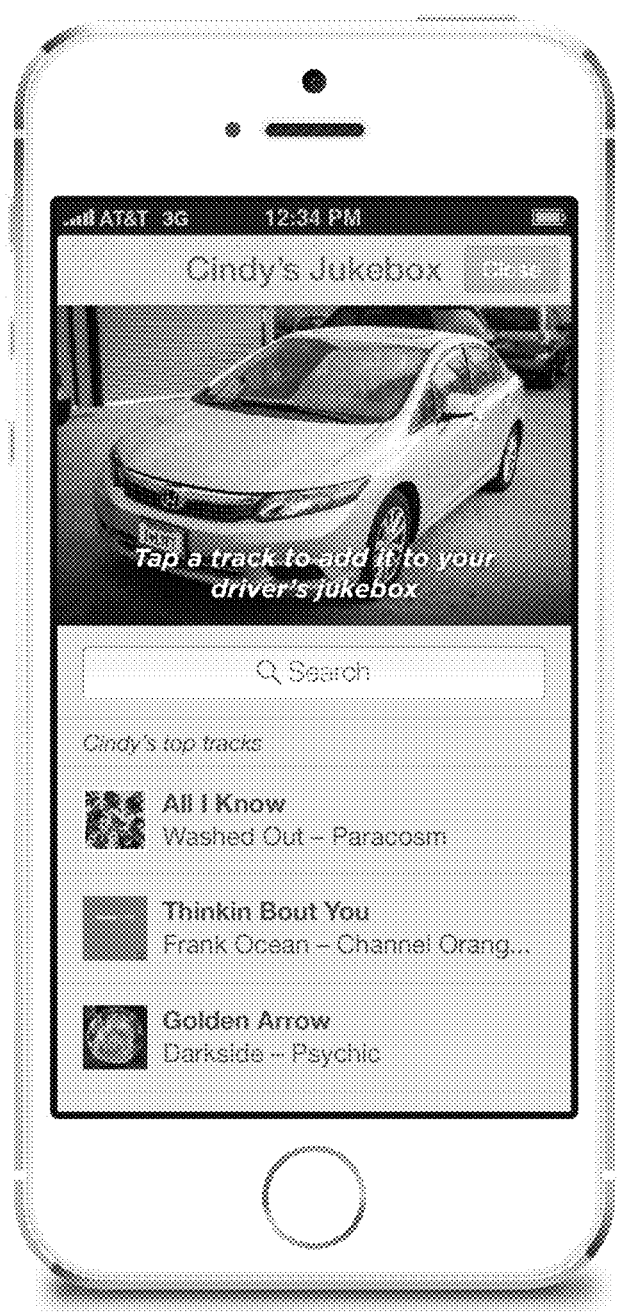
FIG. 3 is a diagram illustrating an embodiment of a user interface for a rider system.

FIG. 3 is a diagram illustrating an embodiment of a user interface for a rider system. In some embodiments, the user interface of FIG. 3 is used by a rider as part of a ride sharing system. In some embodiments, the user interface of FIG. 3 comprises a user interface for a ride sharing app. In the example shown, the user interface of FIG. 3 comprises a jukebox music selection interface for a ride sharing app. The jukebox music selection interface allows a rider to enter music preferences for a driver jukebox. In various embodiments, music preferences comprise music type preferences, artist preferences, song preferences, genre preferences, playlist preferences, or any other appropriate music preferences. In the example shown, a list of top tracks (e.g., an ordered list from most popular to least popular, from most highly rated to least highly rated, etc.) is displayed to the user for the user to select song preferences from. In various embodiments, top tracks comprise user top tracks, music server top tracks, driver top tracks, city top tracks, neighborhood top tracks, top tracks based at least in part on the time of day, or any other appropriate top tracks. In the example shown, tracks selected from the list of top tracks are added to a driver jukebox queue. The rider additionally can search for songs (e.g., using a search box). In some embodiments, songs identified using a search can be selected to be added to a driver jukebox queue.

In some embodiments, a geolocation is used to suggest music. For example, a pickup location and/or dropoff location for the ride (dropoff location is not always provided), along with possibly event data is used to suggest music. For example, in the event that Coldplay is playing at AT&T Park and that's where the rider is headed, related are suggested songs. For another example, in the event that a ride pickup is at the airport and the dropoff is downtown New York City, a famous song(s) about the city is/are suggested.

Figure 4:
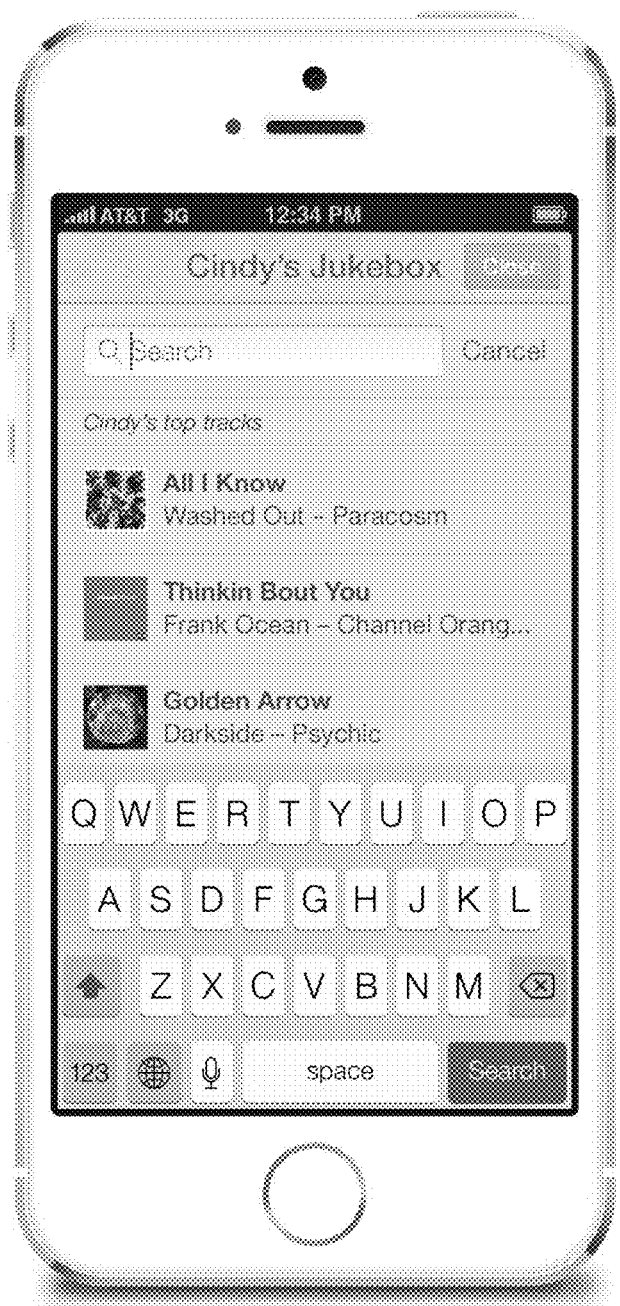
FIG. 4 is a diagram illustrating an embodiment of a user interface for a rider system.

FIG. 4 is a diagram illustrating an embodiment of a user interface for a rider system. In some embodiments, the user interface of FIG. 4 is used by a rider as part of a ride sharing system. In the embodiments, the user interface of FIG. 4 comprises a user interface for a ride sharing app. In the example shown, the user interface of FIG. 4 comprises a search interface. In some embodiments, the search interface of FIG. 4 is shown in response to a user indicating to a search box. The search interface of FIG. 4 shows a search box at the top of the interface, and shows a keyboard for entering a search into the search box. In some embodiments, the search interface of FIG. 4 additionally shows search results.

Figure 5:
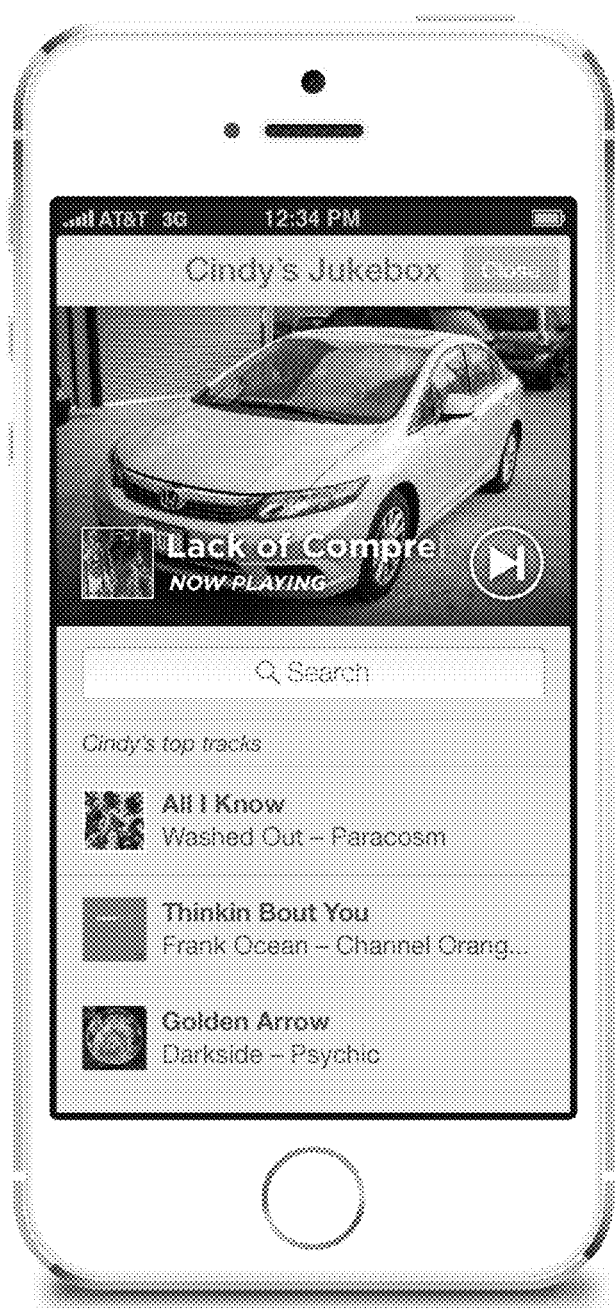
FIG. 5 is a diagram illustrating an embodiment of a user interface for a rider system.

FIG. 5 is a diagram illustrating an embodiment of a user interface for a rider system. In some embodiments, the user interface of FIG. 5 is used by a rider as part of a ride sharing system. In the embodiments, the user interface of FIG. 5 comprises a user interface for a ride sharing app. In the example shown, the user interface of FIG. 5 comprises a now playing interface. The now playing interface displays information describing a currently playing song. In some embodiments, the currently playing song comprises a song in a driver jukebox queue. In some embodiments, songs from a driver jukebox queue begin playing when a ride starts (e.g., when the driver indicates the ride starts, when a ride start is detected, etc.). In some embodiments, the now playing interface is displayed when songs begin playing. In some embodiments, the now playing interface displays track information (e.g., track title, track artist, track album, track year, etc.). In some embodiments, the now playing interface displays audio controls (e.g., next track, pause, volume up, volume down, etc.) that are able to control the music playing on the jukebox (e.g., the music streaming via the driver's device and the vehicle audio system). In some embodiments, the now playing interface displays a queue button (e.g., for displaying a jukebox queue interface).

Figure 6:
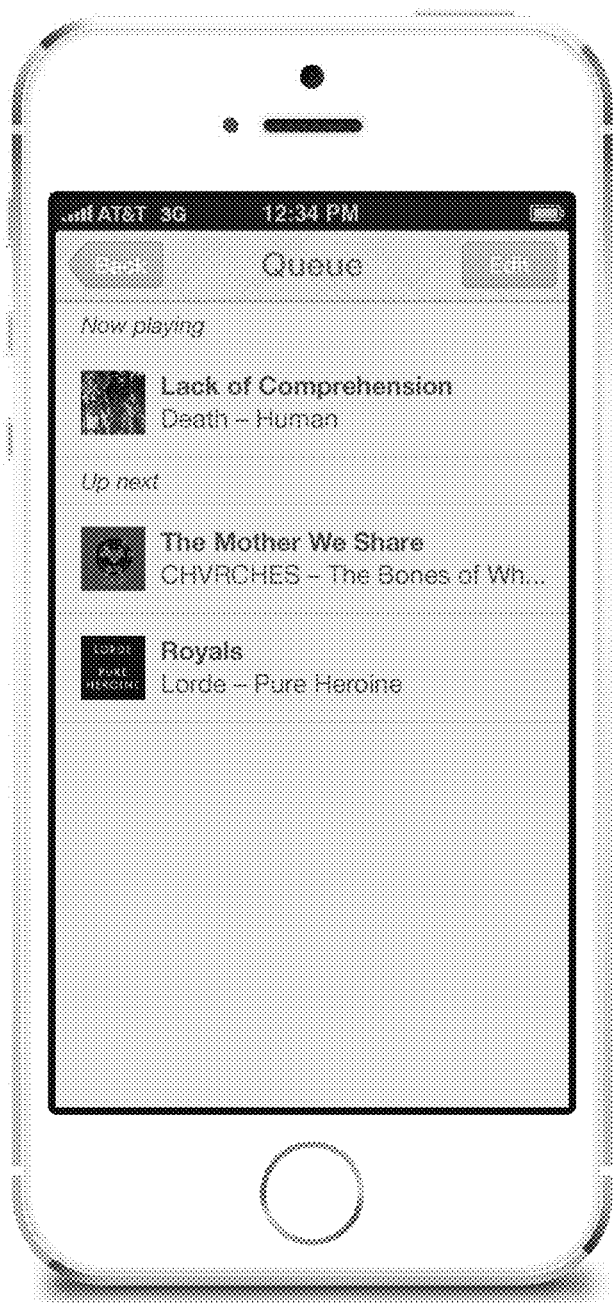
FIG. 6 is a diagram illustrating an embodiment of a user interface for a rider system.

FIG. 6 is a diagram illustrating an embodiment of a user interface for a rider system. In some embodiments, the user interface of FIG. 6 is used by a rider as part of a ride sharing system. In the embodiments, the user interface of FIG. 6 comprises a user interface for a ride sharing app. In the example shown, the user interface of FIG. 6 comprises a jukebox queue interface. In the example shown, the jukebox queue interface displays a currently playing song and a set of upcoming songs queued to play after the currently playing song. In some embodiments, in the event that a song is added to the jukebox queue, it is displayed as part of the set of upcoming songs. In some embodiments, a rider can select a song in the jukebox queue to skip ahead in the queue to the selected song. The user is able to change the order of the list by manipulating the queued items using the interface of the user's device (e.g., dragging a selection to a different spot in the queue). The user is able to select a queued item and learn more information about a queued selection.

Figure 7:
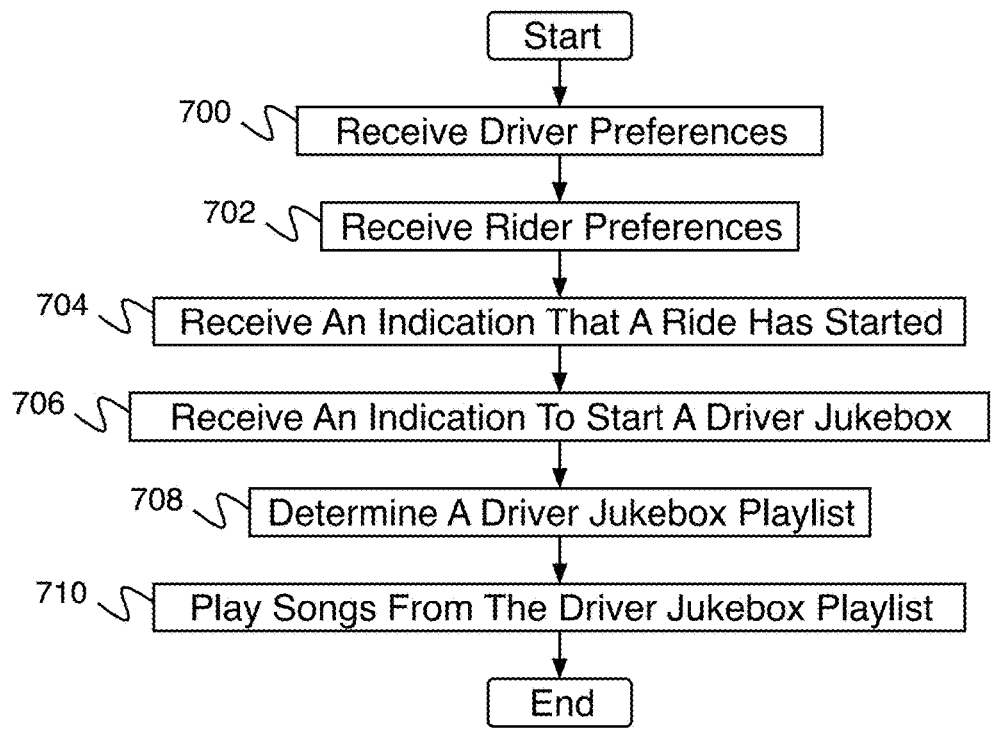
FIG. 7 is a flow diagram illustrating an embodiment of a process for a driver jukebox system.

FIG. 7 is a flow diagram illustrating an embodiment of a process for a driver jukebox system. In some embodiments, the process of FIG. 7 is performed by a system for a driver jukebox. In the example shown, in 700, driver preferences are received (e.g., via a user interface for a driver system such as the user interface of FIG. 1). In 702, rider preferences are received (e.g., via a user interface for a rider system such as the user interface of FIG. 3). In 704, an indication that a ride has started is received. In some embodiments, an indication that a ride has started is determined. In some embodiments, an indication that a ride has started is received from a driver. In 706, an indication to start a driver jukebox is received. In some embodiments, an indication that a ride has started comprises an indication to start a driver jukebox. In some embodiments, an indication to start a driver jukebox is received from a driver. In some embodiments, an indication to start a driver jukebox is received from a rider. In 708, a driver jukebox playlist is determined. In some embodiments, a driver jukebox playlist is received from a rider. In some embodiments, a driver jukebox playlist comprises a jukebox queue. In 710, songs from the driver jukebox playlist are played. For example, a song from a playlist (e.g., a song selected by a user using a user device) is transmitted from a music server via a network (e.g., a cellular network, wireless network, etc.) to a driver's device and played on a speaker (e.g., a driver device speaker, a vehicle speaker—for example, as coupled to the driver device using a Bluetooth connection, etc.).

Figure 8A:
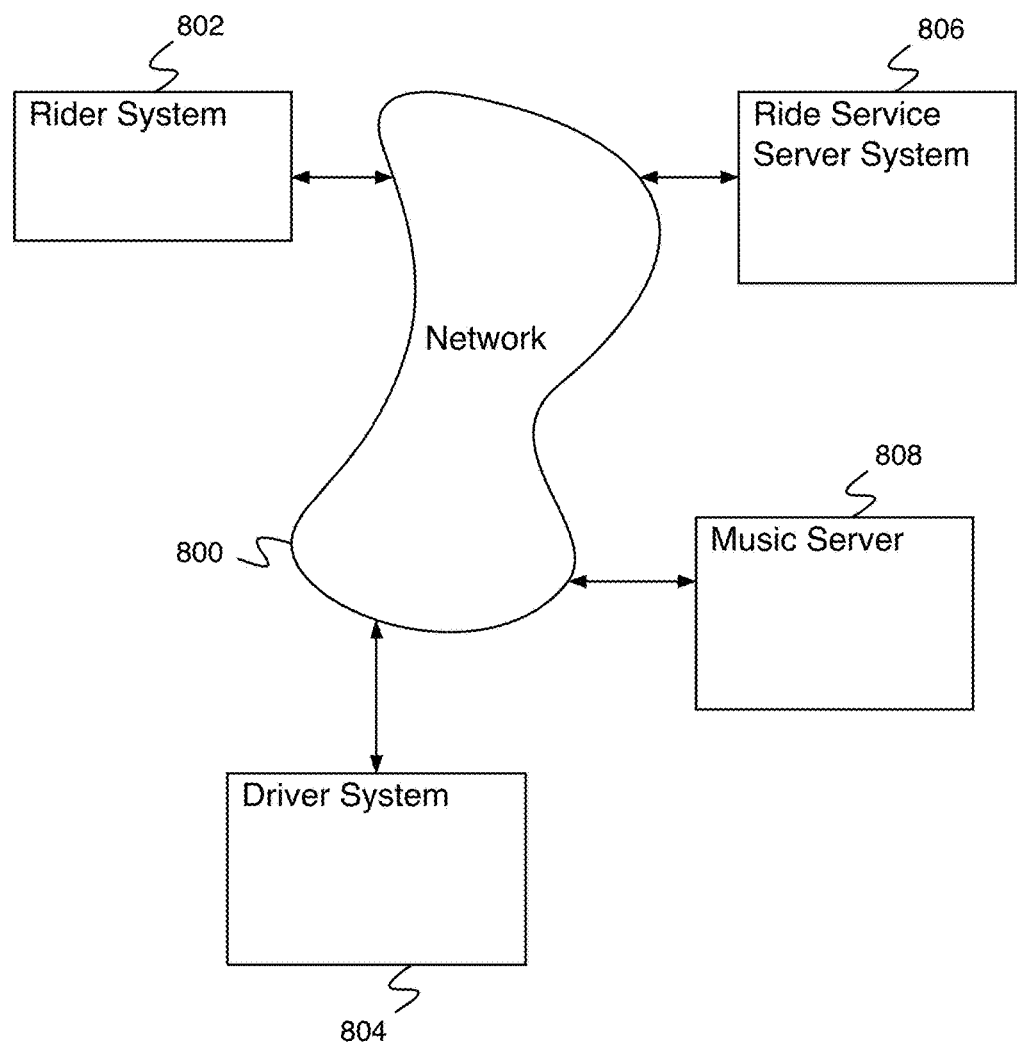
FIG. 8A is a block diagram illustrating an embodiment of a system for a driver jukebox system.

FIG. 8A is a block diagram illustrating an embodiment of a system for a driver jukebox system. In the example shown, FIG. 8A comprises network 800. In various embodiments, network 800 comprises one or more of the following: a local area network, a wide area network, a wired network, a wireless network, the Internet, an intranet, a storage area network, a cellular network, or any other appropriate communication network. Rider system 802 and driver system 804 comprise user systems (e.g., computing systems for operation by users—for example, the rider and the driver, respectively). In some embodiments, one or more of rider system 802 and driver system 804 comprise systems accessed by users directly (e.g., the user is in proximity with the user system). In various embodiments, user system 802 and user system 804 are each one of a plurality of systems, of which one or more of the systems are accessed by a user remotely (e.g., a driver or rider is not in proximity with the user system, and accesses the user system via network 800 and a separate user system). In the example shown, rider system 802 and driver system 804 comprise mobile devices (e.g., smartphones, tablet computers, etc.). Rider system 802 and driver system 804 comprise systems accessing ride service server system 806 (e.g., accessing ride service server system 806 via network 800). In various embodiments, there are 2, 5, 22, 122, 4320, 26100, or any other appropriate number of user systems (e.g., rider systems and driver systems) accessing ride service server system 806. Ride service server system 806 comprises a system for managing drivers giving rides to riders. In some embodiments, ride service server system 806 comprises a system for connecting a rider and a driver. In some embodiments, ride service server system 806 comprises a system for determining a driver to assign a ride to. In various embodiments, ride service server system 806 comprises a computer, a computer with multiple processors, multiple computers connected via a local network, multiple computers connected via a wide area network, multiple computers connected via the Internet, multiple computers connected via network 800, or any other appropriate computing system or systems. Music server 808 comprises a music server for serving music data. In some embodiments, music server 808 comprises a server for receiving a request for a song and providing a data stream comprising the song. In some embodiments, music server 808 requires a credential. In some embodiments, music server 808 comprises a commercial music service (e.g., Spotify™, Pandora™, Rdio™, etc.). In some embodiments, music server 808 is in communication with one or more of rider system 802, driver system 804, ride service server system 806 and music server 808. In some embodiments, multiple music servers are available, each associated with a different music service. In various embodiments, the processors comprising rider system 802, driver system 804, ride service server system 806, and music server 808 comprise any one of a variety of proprietary or available single or multi-processor systems (e.g., an Intel™-based processor) or other type of available processor able to support communications in accordance with each particular embodiment and application.

Figure 8B:
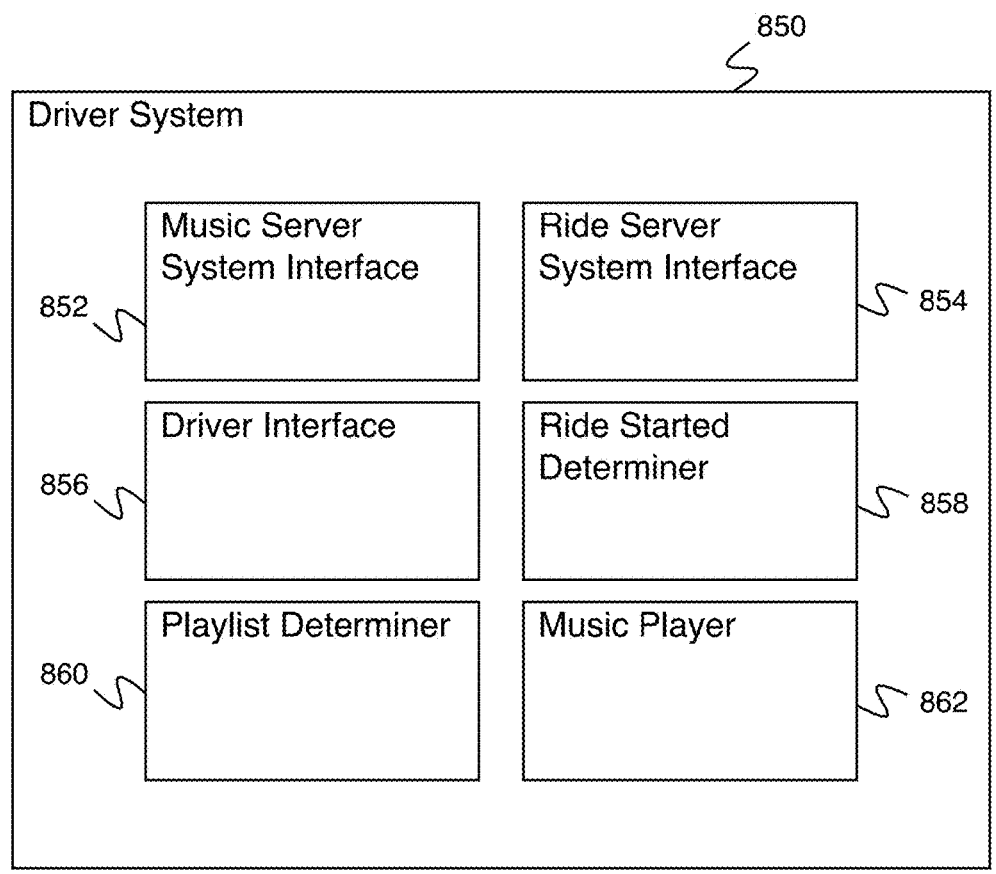
FIG. 8B is a block diagram illustrating an embodiment of a driver system.

FIG. 8B is a block diagram illustrating an embodiment of a driver system. In some embodiments, driver system 850 of FIG. 8B comprises driver system 804 of FIG. 8A. In the example shown, driver system 850 comprises music server system interface 852. In some embodiments, music server system interface 852 comprises a music server system interface for communicating with a music server system (e.g., music server 808 of FIG. 8A). In some embodiments, music server system interface 852 comprises a music server system interface for providing a driver credential to a music server system. In some embodiments, music server system interface 852 is implemented using a processor. In the example shown, driver system 850 additionally comprises ride server system interface 854. In some embodiments, ride server system interface 854 comprises a ride server system interface for interacting with a ride server system (e.g., ride service server system 806 of FIG. 8A). In some embodiments, ride server system interface 854 comprises a ride server system interface for interacting with a rider system (e.g., rider system 802 of FIG. 8A) via a ride server system. In some embodiments, ride server system interface 854 comprises a ride server system interface for receiving a rider music preference from a rider device. In some embodiments, ride server system interface 854 is implemented using a processor. Driver interface 856 comprises a driver interface for interacting with a driver. In some embodiments, driver interface 856 comprises an input device (e.g., a touchscreen)

and an output device (e.g., a display, a speaker, a transmitter, an audio output interface, etc.). In some embodiments, driver interface 856 comprises an interface for receiving driver control information for controlling the music player. In some embodiments, driver interface 856 is implemented using a processor. Ride started determiner 858 comprises a ride started determiner for determining a ride has started. In some embodiments, ride started determiner determines a ride has started using an indication (e.g., received from driver interface 856) that a ride has started. In some embodiments, ride started determiner 858 determines a ride has started using a global positioning system (e.g., the indication for starting a ride is determined automatically in the event that a rider device is detected as collocated with the driver device and the driver device location changes or the rider device and the driver device move together). In some embodiments, ride started determiner 858 is implemented using a processor. Playlist determiner 860 comprises a playlist determiner for determining a playlist. In some embodiments, playlist determiner 860 determines a playlist based at least in part on a rider music preference (e.g., a rider music preference received from ride server system interface 854). In some embodiments, playlist determiner 860 is implemented using a processor. Music player 862 comprises a music player for playing music. In some embodiments, music player 862 comprises a music player for playing a playlist using a music stream. In some embodiments, music player 862 receives a playlist and requests a music stream. In some embodiments, music player receives a music stream and provides a music output (e.g., on an audio output jack, via a wireless interface—for example, a Bluetooth connection of a vehicle, etc.). In some embodiments, music player 862 receives an indication from music server system interface 852 to start playing (e.g., in the event that the ride has started, automatically in the event that the ride has started, etc.) the music of the playlist. In some embodiments, music player is implemented using a processor. In various embodiments, the elements of driver system 850 are implemented using a single processor, are each implemented using their own processor, or are implemented combined onto multiple processors in any other appropriate way.

Figure 9:
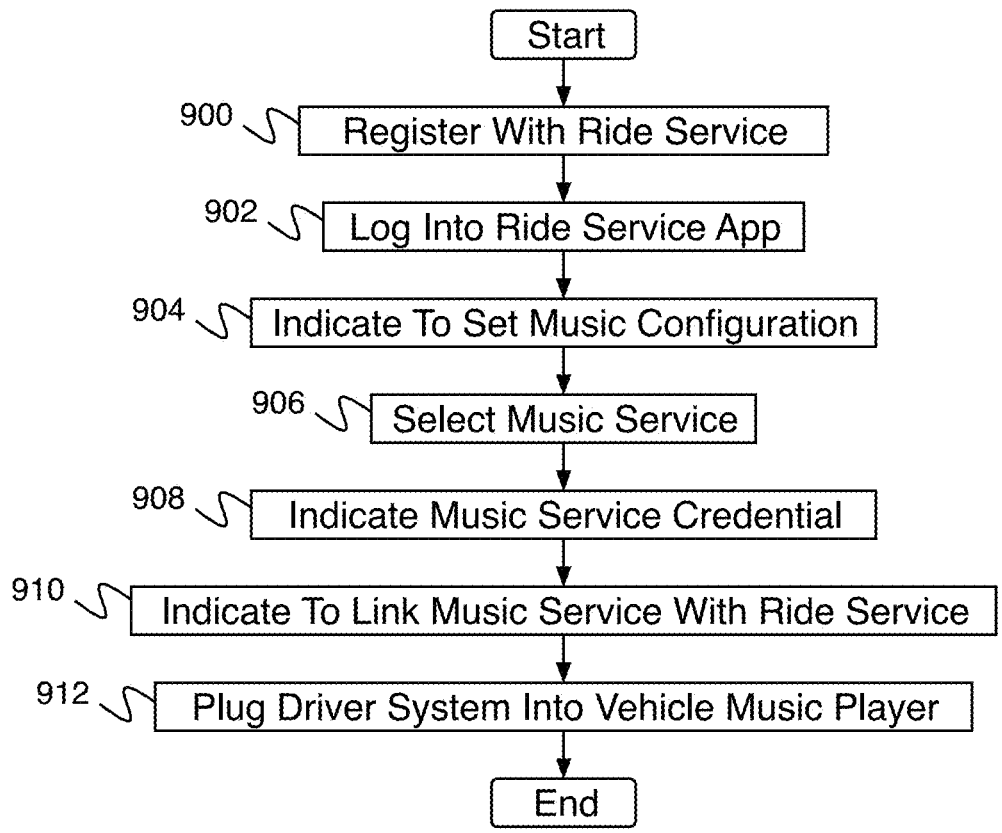
FIG. 9 is a flow diagram illustrating an embodiment of a driver process for registering as a jukebox system.

FIG. 9 is a flow diagram illustrating an embodiment of a driver process for registering as a jukebox system. In some embodiments, the process of FIG. 9 is performed by a driver using a driver system (e.g., driver system 804 of FIG. 8A). In the example shown, in 900, the driver registers with a ride service. In some embodiments, registering with a ride service comprises communicating with a ride service server system. In various embodiments, registering with a ride service comprises signing up to be a driver, entering driver data, passing a driver qualification, passing a background check, or any other appropriate ride service registration. In 902, the driver logs into a ride service app (e.g., ride service software running on a driver system). In 904, the driver indicates to set a music configuration (e.g., for a jukebox system). In 906, the driver selects a music service. In some embodiments, the driver selects from a set of available commercial music services (e.g., Spotify™, Pandora™, Rdio™, etc.). In some embodiments, only one music service is available for selection. In 908, a music service credential is indicated (e.g., a password, an authentication token, a biometric identifier, etc.). In some embodiments, the music service credential authenticates the driver to use the music service. In 910, the driver indicates to link the music service with the ride service. In some embodiments, linking the music service with the ride service comprises allowing music requests to be made of the music service by the ride service using the driver credential. In some embodiments, when the music service is linked with the ride service, a credential token is stored on the driver system indicating that the ride service is allowed to access the music service. In some embodiments, the credential token is additionally stored on a server system (e.g., a ride service server system). In some embodiments, the linkage of the music service and the ride service lasts until it is explicitly unlinked (e.g., until the driver requests the linkage to be canceled). In 912, the driver plugs the driver system into a vehicle music player. For example, the driver system is capable of playing music using the vehicle sound system. In some embodiments, the driver system authenticates a connection with a vehicle system and the driver system is able to use the vehicle system's sound system using a wireless connection (e.g., a Bluetooth™ connection). For example, the driver device provides a credential to the vehicle's sound system either on entry or initial to pair with the vehicle sound system so that the driver device is able to use the sound system to play music.

Figure 10:
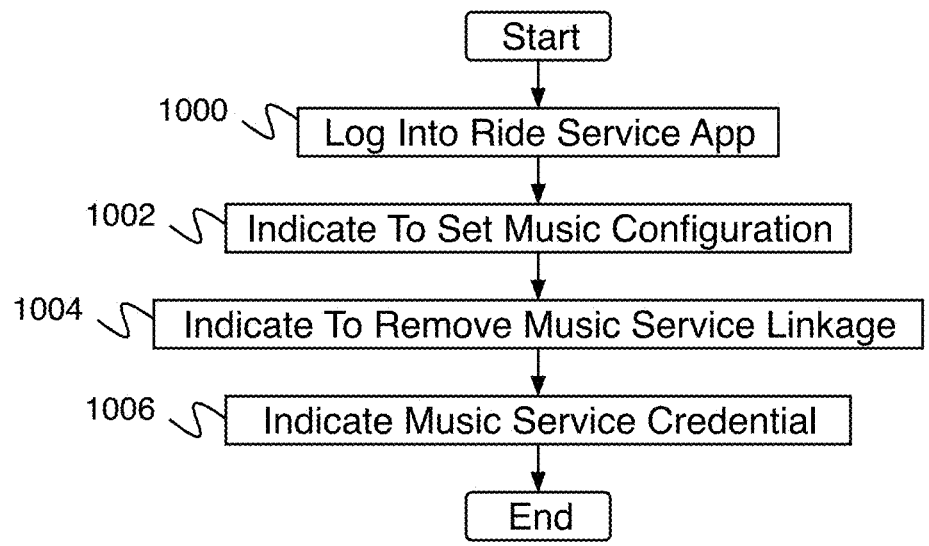
FIG. 10 is a flow diagram illustrating an embodiment of a driver process for unlinking a music service from a ride service.

FIG. 10 is a flow diagram illustrating an embodiment of a driver process for unlinking a music service from a ride service. In some embodiments, the process of FIG. 10 is executed by a driver using a driver system (e.g., driver system 804 of FIG. 8A). In some embodiments, the process of FIG. 10 removes a linkage (e.g., a linkage as set using the process of FIG. 9). In the example shown, the driver logs into a ride service app. In 1002, the driver indicates to set a music configuration. In 1004, the driver indicates to remove a music service linkage. In some embodiments, when the driver indicates to remove a music service linkage, the driver system contacts the music service with an indication to remove a music service linkage. In 1006, the driver indicates a music service credential (e.g., to authenticate the request to remove the music service linkage to the music server). In some embodiments, when the music service linkage is removed, an associated credential token is deleted from the driver system. In some embodiments, when the music service linkage is removed, an associated credential token is deleted from the ride service server system. In some embodiments, when the music service linkage is removed, the driver system indicates to the ride service server system that the music service linkage has been removed (e.g., that the driver no longer comprises a jukebox enabled driver).

Figure 11:
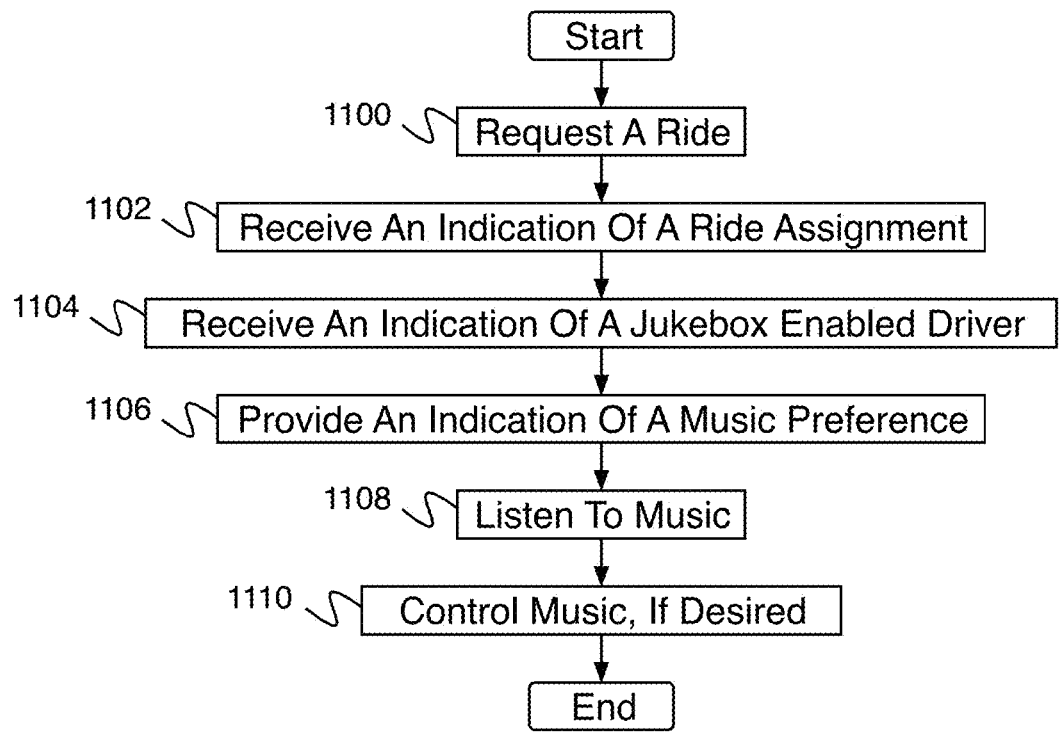
FIG. 11 is a flow diagram illustrating an embodiment of a rider process for a driver jukebox system.

FIG. 11 is a flow diagram illustrating an embodiment of a rider process for a driver jukebox system. In some embodiments, the process of FIG. 11 is executed by a rider using a rider system (e.g., rider system 802 of FIG. 8A). In the example shown, in 1100, a ride is requested. In some embodiments, a ride is requested via a ride service app. In 1102, an indication of a ride assignment is received. In some embodiments, an indication of a ride assignment is received from a ride service server system. In 1104, an indication of a jukebox enabled driver is received. In some embodiments, an indication of a jukebox enabled driver comprises an indication that the driver associated with the ride assignment comprises a jukebox enabled driver. In 1106, the rider provides an indication of a music preference. In various embodiments, a music preference comprises a music type preference, an artist preference, a song preference, a genre preference, a playlist preference, or any other appropriate music preference. In some embodiments, an indication of a music preference is provided in response to a request for an indication of a music preference. In various embodiments, a request for an indication of a music preference comprises a list of music types, a list of artists, a list of songs, a list of genres, a list of playlists, or any other appropriate request for an indication of a music preference. In some embodiments, a request for an indication of a music preference comprises a playlist for selecting songs to listen to. In some embodiments, an indication of a music preference comprises a selection of songs in a queue for listening during a ride. In 1108, the rider listens to music. In some embodiments, the music comprises music according to the music preference. In some embodiments, the music starts when the ride starts (e.g., when the driver starts driving, when the driver indicates the ride has started, etc.). In 1110, the rider controls the music, if desired. In some embodiments, the rider controls the music (e.g., increases or lowers the volume, skips a song, selects a next song to play, stops the music playing, etc.).

Figure 12:
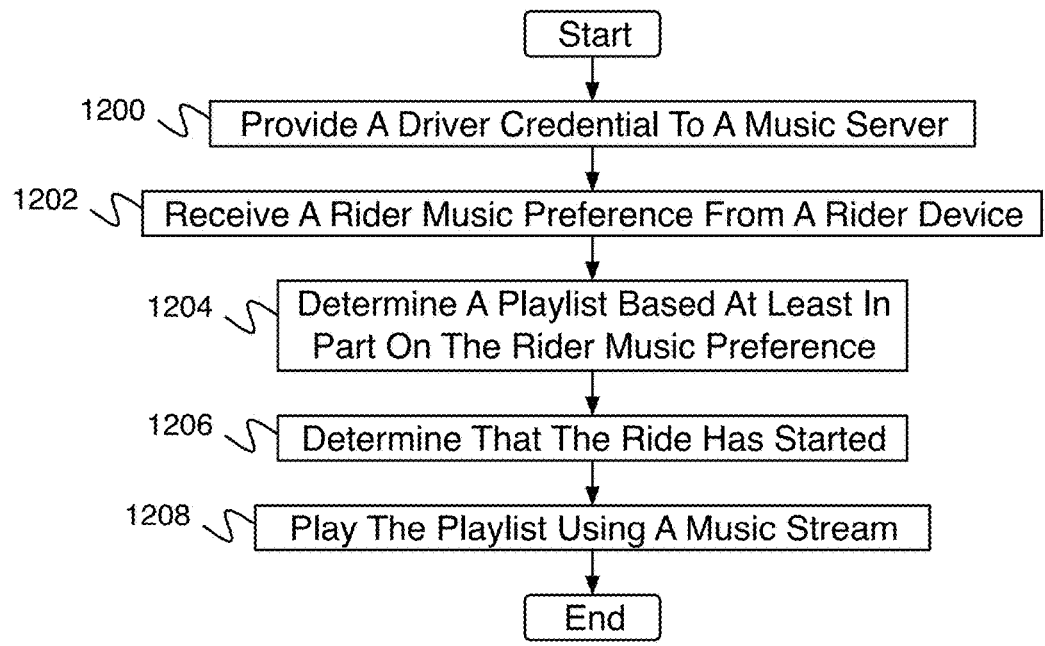
FIG. 12 is a flow diagram illustrating an embodiment of a process for a driver jukebox system.

FIG. 12 is a flow diagram illustrating an embodiment of a process for a driver jukebox system. In some embodiments, the process of FIG. 12 is executed by a driver system (e.g., driver system 804 of FIG. 8A). In the example shown, in 1200, a driver credential is provided to a music server. In some embodiments, the driver credential authenticates the driver system to access music on the music server. In 1202, a rider music preference is received from a rider device. In 1204, a playlist is determined based at least in part on the rider music preference. In some embodiments, the playlist is pre-buffered from a music server to the driver device to enable the device to play music upon receiving an indication to start playing the music without significant delay. In 1206, it is determined that the ride has started. In some embodiments, determining that the ride has started comprises receiving an indication that the ride has started. In some embodiments, determining that the ride has started comprises determining that the ride has started using sensor data (e.g., global positioning systems data). In some embodiments, an indication is provided to a music service or a music player to start playing the playlist in the event that the ride has started. In 1208, the playlist is played using a music stream. In some embodiments, playing the playlist using a music stream comprises requesting the music stream from a music server. In some embodiments, playing the playlist using a music stream comprises receiving the music stream from the music server.

Figure 13:
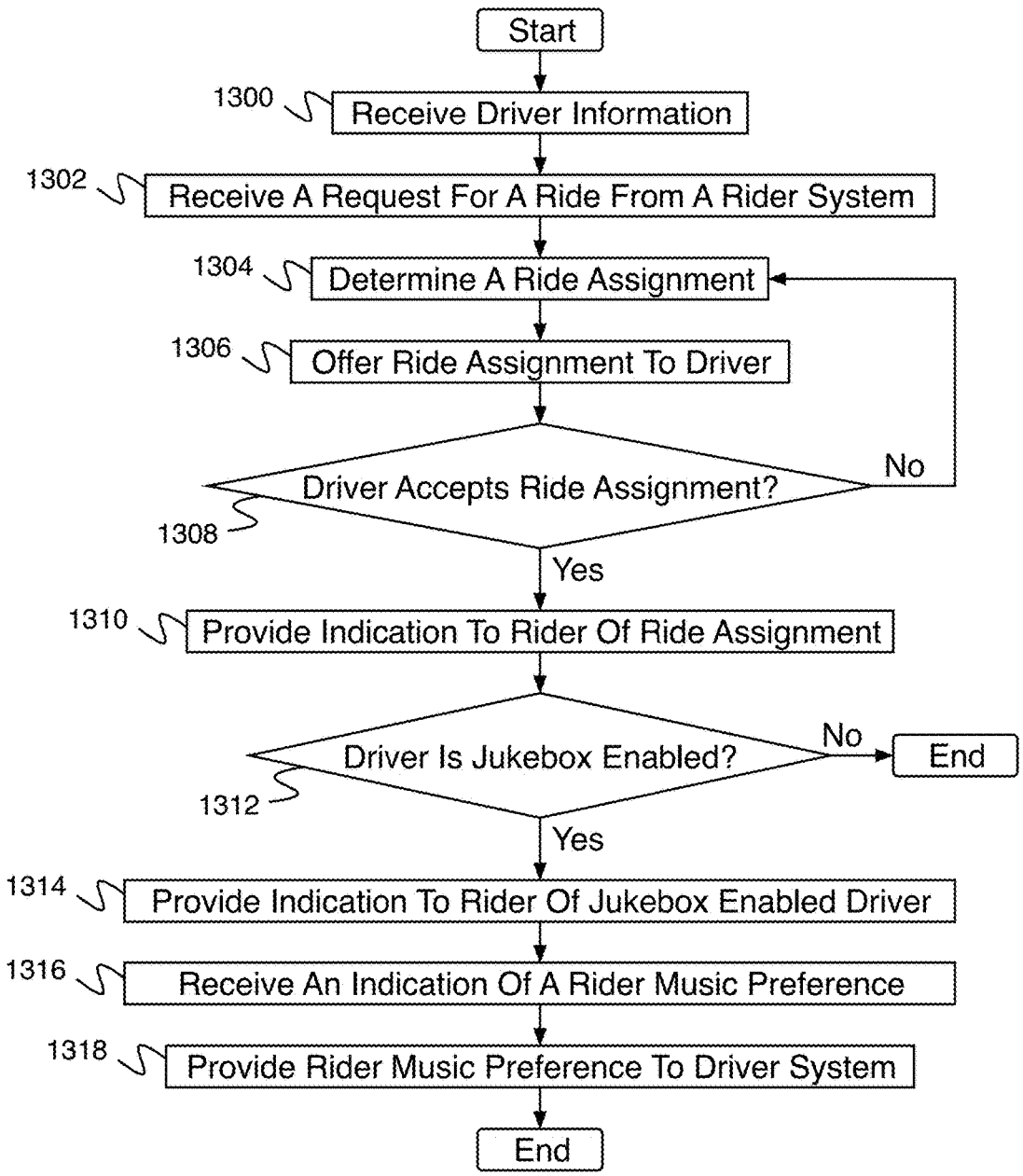
FIG. 13 is a flow diagram illustrating an embodiment of a process for coordinating a driver jukebox system.

FIG. 13 is a flow diagram illustrating an embodiment of a process for coordinating a driver jukebox system. In some embodiments, the process of FIG. 13 is executed by a ride service server system (e.g., ride service server system 806 of FIG. 8A). In the example shown, in 1300, driver information is received. In various embodiments, driver information comprises driver names, driver locations, driver vehicle types, driver images, vehicle images, driver jukebox status, or any other appropriate driver information. In 1302, a request is received from a rider system for a ride. In various embodiments, the ride request comprises a rider location, a rider destination, a rider party size, rider preferences (e.g., vehicle preferences, jukebox preferences, or any other appropriate preferences). In 1304, a ride assignment is determined. In various embodiments, the ride assignment is based at least in part on driver locations, a rider location, driver assigned routes, rider preferences, previous rejected ride assignments, or any other appropriate criteria. In 1306, the ride assignment is offered to the driver (e.g., to the driver assigned to the ride). In 1308, it is determined whether the driver accepts the ride assignment (e.g., whether an indication that the driver accepts the assignment is received). In the event it is determined that the driver does not accept the ride assignment, control passes to 1304 (e.g., a different ride assignment is determined). In the event it is determined that the driver accepts the ride assignment, control passes to 1310. In 1310, an indication of the ride assignment is provided to the rider. In 1312, it is determined whether the driver is jukebox enabled. In the event it is determined that the driver not is jukebox enabled, the process ends. In the event it is determined that the driver is jukebox enabled, control passes to 1314. In 1314, an indication is provided to the rider of a jukebox enabled driver. In 1316, an indication of a rider music preference is received. In some embodiments, a request for a rider music preference is provided to the rider. In 1318, the rider music preference is provided to the driver system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method, comprising:
   receiving, from a first computing device, a ride request including at least one of a pickup location or a destination location associated with a user of the first computing device;
   receiving an indication from a second computing device that the ride request has been accepted;
   determining that a ride corresponding to the ride request has been initiated based on:
      receiving sensor data associated with the first computing device and sensor data associated with the second computing device to determine a location of the first computing device and a location of the second computing device; and
      determining, based on the received sensor data, that the first computing device and the second computing device are moving together;
   based on a response to the ride request being accepted and on determining that the ride corresponding to the ride request has been initiated, sending to the first computing device, first audio information corresponding to available audio data;
   receiving, from the first computing device, control data comprising an audio control command corresponding to an action to be taken with respect to the available audio data, wherein the available audio data is being streamed from a third-party audio service; and
   sending the control data to the second computing device, wherein the control data operates to cause the second computing device to send the audio control command to the third-party audio service.

2. The computer-implemented method of claim 1, wherein determining that the ride corresponding to the ride request has been initiated further comprises receiving, from the second computing device, an indication that the ride corresponding to the ride request has been initiated based on a user interaction with a driver interface on the second computing device.

3. The computer-implemented method of claim 1, further comprising:
   providing, to the third-party audio service, an access credential for the third-party audio service, the access credential being associated with a user of the second computing device,
   wherein at least a portion of the available audio data corresponds to audio accessible from the third-party audio service.

4. The computer-implemented method of claim 3, wherein the user of the first computing device does not have an access credential for the third-party audio service.

5. The computer-implemented method of claim 3, further comprising:
receiving, from the first computing device, an indication that the user of the first computing device has an access credential for the third-party audio service;
sending, to the first computing device, a request for second audio information corresponding to second available audio data, wherein the second available audio data is associated with the user of the first computing device; and
determining at least one audio data selection common to the first audio information and the second audio information.

6. The computer-implemented method of claim 1, wherein the first audio information comprises at least one of an audio type preference, an artist preference, a song preference, a genre preference, a playlist preference, or a subject preference.

7. The computer-implemented method of claim 1, wherein the first audio information comprises an ordered playlist generated on the first computing device, and wherein the ordered playlist includes a plurality of audio data selections of the available audio data.

8. The computer-implemented method of claim 1, further comprising automatically generating an indication to play at least one audio data selection upon determining that a ride corresponding to the ride request has been initiated.

9. The computer-implemented method of claim 1, further comprising providing, to the second computing device, an indication to pre-buffer at least one audio data selection to the second computing device prior to the ride corresponding to the ride request being initiated.

10. The computer-implemented method of claim 1 further comprising:
determining that the ride has concluded; and
generating a ride receipt corresponding to the ride, wherein the ride receipt comprises information corresponding to one or more audio data selections played during the ride.

11. The computer-implemented method of claim 1, wherein the available audio data comprises one or more of a song, a podcast, a radio station, live event audio, an audiobook, a playlist, or an audio track of an audio-visual work.

12. The computer-implemented method of claim 1, wherein the first audio information comprises a subset of the available audio data.

13. The computer-implemented method of claim 12, wherein the subset of the available audio data is ordered according to at least one criteria.

14. The computer-implemented method of claim 12, wherein the first audio information is based at least upon location data.

15. A system, comprising:
at least one processor; and
at least one non-transitory memory device comprising instructions that, when executed by the at least one processor, cause a computer system to:
receive, from a first computing device, a ride request including at least one of a pickup location or a destination location associated with a user of the first computing device;
receive an indication from a second computing device that the ride request has been accepted;
determine that a ride corresponding to the ride request has been initiated based on:
receiving sensor data associated with the first computing device and sensor data associated with the second computing device to determine a location of the first computing device and a location of the second computing device;
determining, based on the received sensor data, that the first computing device and the second computing device are moving together; and
based on a response to the ride request being accepted and on determining that the ride corresponding to the ride request has been initiated, send to the first computing device, first audio information corresponding to available audio data;
receive, from the first computing device, control data comprising an audio control command corresponding to an action to be taken with respect to the available audio data, wherein the available audio data is being streamed from a third-party audio service; and
send the control data to the second computing device, wherein the control data operates to cause the second computing device to send the audio control command to the third-party audio service.

16. The system of claim 15, further comprising instructions, that when executed by the at least one processor, cause the computer system to:
provide, to the third-party audio service, an access credential for the third-party audio service, the access credential being associated with a user of the second computing device,
wherein at least a portion of the available audio data corresponds to audio accessible from the third-party audio service.

17. The system of claim 15, further comprising instructions that, when executed by the at least one processor, cause the computer system to provide, to the second computing device, an indication to pre-buffer at least one audio data selection to the second computing device prior to the ride corresponding to the ride request being initiated.

18. A non-transitory computer readable medium comprising instructions that, when executed by at least one processor, cause a computing device to:
receive, from a first computing device, a ride request including at least one of a pickup location or a destination location associated with a user of the first computing device;
receive an indication from a second computing device that the ride request has been accepted;
determine that a ride corresponding to the ride request has been initiated based on:
receiving sensor data associated with the first computing device and sensor data associated with the second computing device to determine a location of the first computing device and a location of the second computing device;
determining, based on the sensor data, that the first computing device and the second computing device are moving together;
based on a response to the ride request being accepted and on determining that the ride corresponding to the ride request has been initiated, send, to the first computing device, first audio information corresponding to available audio data;
provide, to a third-party audio service, an access credential for the third-party audio service, the access credential being associated with a user of the second computing device, and wherein at least a portion of the available audio data corresponds to audio accessible from the third-party audio service;

receive, from the first computing device, an indication that the user of the first computing device has the access credential for the third-party audio service;

send, to the first computing device, a request for second audio information corresponding to second available audio data, the second available audio data associated with the user of the first computing device; and determine at least one audio data selection common to the first audio information and the second audio information.

19. The non-transitory computer readable medium of claim 18, further comprising instructions that, when executed by the at least one processor, cause the computing device to:

receive, from the first computing device, control data comprising an audio control command corresponding to an action to be taken with respect to a currently-playing audio data selection, wherein the currently-playing audio data selection is being streamed from a third-party audio service; and send the control data to the second computing device, wherein the control data operates to cause the second computing device to send the audio control command to the third-party audio service.

20. The non-transitory computer readable medium of claim 18, further comprising instructions that, when executed by the at least one processor, cause the computing device to:

determine that the ride has concluded; and generate a ride receipt corresponding to the ride, wherein the ride receipt comprising information corresponding to one or more data selections played during the ride.

* * * * *